United States Patent [19]

Bouin

[11] Patent Number: 4,805,387
[45] Date of Patent: Feb. 21, 1989

[54] HARVESTER DEVICE FOR STALKED PLANTS OF THE SUNFLOWER KIND WHICH CAN BE FITTED ON A CUTTER FOR STALKED CORN TYPE PLANTS

[76] Inventor: Gérard Bouin, 9, rue de la Gravelle, 86220 Dange Saint-Romain, France

[21] Appl. No.: 101,403

[22] Filed: Sep. 28, 1987

[30] Foreign Application Priority Data

Sep. 29, 1986 [FR] France ................. 86 13660

[51] Int. Cl.⁴ .......................... A01D 45/02
[52] U.S. Cl. .......................... 56/66; 56/102
[58] Field of Search ............ 56/66, 98, 102, 119

[56] References Cited

U.S. PATENT DOCUMENTS 1,702,328  2/1929  Webb .
4,419,856  12/1983  Taylor .

FOREIGN PATENT DOCUMENTS 8600471  2/1986  Fed. Rep. of Germany .
2264472  10/1975  France .
2426397  12/1979  France .

Primary Examiner—Stephen F. Husar
Attorney, Agent, or Firm—Cushman, Darby & Cushman

[57] ABSTRACT

The harvesting device consists of a harvesting plate intended to be mounted on a cutter for corn type plants with stalks, instead of one of the conventional corn stripper plates. This harvesting plate comprises a cut out which is offset in relation to the inlet passage in such a way that the stalks can be completely taken over by the movable fingers situated on one side only of the inlet passage.

9 Claims, 3 Drawing Sheets 4,805,387

HARVESTER DEVICE FOR STALKED PLANTS OF THE SUNFLOWER KIND WHICH CAN BE FITTED ON A CUTTER FOR STALKED CORN TYPE PLANTS

FIELD OF THE INVENTION

The invention relates to a harvester device for stalked plants of the sunflower kind which can be fitted on a cutter for corn type stalked plants, this cutter comprising at least two stripper plates having two adjoining edges oriented substantially parallel to the advancing direction of the cutter, these two edges defining an inlet passage for the stalks, and movable fingers for displacement above the plates towards the cutter on either side of the inlet passage.

Since the cultivation of sunflowers is expanding, thanks to agricultural research which places increasingly early varieties at the farmers' disposal letting the surface areas reserved for this cultivation to advance northwards, the need is felt for improving the current harvesting techniques.

PRIOR ART

The current harvesting machines for sunflowers or other similar stalked plants are combine harvesters for grain equipped with specific cutters for sunflowers or most frequently, grain cutters provided with plates for sunflowers and screened beaters. This most widely used method does not allow beaten down sunflowers to be harvested. Only cutters specific to sunflowers allow this, but this equipment necessitates very expensive investment beyond the financial reach of most farming systems, where sunflowers are grown at the same time as corn, which is mostly the case at present in a farming system.

French publication No. 2 426 397 proposes a sunflower cutter which tries to meet this requirement. Its practical implementation and assessment make it possible to ascertain that the plant stalks are cut by means of the simultaneous action of (a) pulling grippers for the plant fixed to chains situated on either side of a support for rollers exerting a downward pull on the stalks, and of (b) a cutter knife. This method, because of the downward pull on the stalks exerted by the rollers and their being cut by the blade in their upper portion and hence very near their head, entails a loss of seeds by spillage on the ground caused by the jamming of the stalks due to their bad engagement on the cutter, and by an unduly fierce downward pull caused by the rollers entailing violent shocks for the heads and detachment of the seeds.

OBJECT OF THE INVENTION

The principal object of the invention is to provide a harvesting device for stalked plants of the sunflower kind which should be simple in design and in operation and which can be fitted on any cutter for corn type plants.

It is a further object of the invention to provide a harvesting device making it possible to reduce the losses by spillage on the ground or by the dropping of the head outside the machine, in particular by reducing the shocks to which the heads are subjected.

It is a still further object of the invention to provide a harvesting device which is efficient in harvesting beaten down plants. It is a further object to provide a harvesting device which is capable of being very easily fitted by a single unskilled person. This setting must be very simple and its dismounting and replacement must be very easy to carry out.

SUMMARY OF THE INVENTION

In accordance with the invention, a harvesting device for stalked plants of the sunflower kind which can be fitted on any cutter for corn type plants, this cutter comprising: (a) at least two stripper plates having edges orientated substantially parallel to the direction of advance of the cutter, these edges defining an inlet passage for the stalks, and (b) movable fingers mounted for displacement above the plates towards the cutter on either side of the inlet passage, is characterised in that it comprises a harvesting plate intended to be mounted instead of one of the stripper plates, this harvesting plate comprising a cut out which is offset in relation to the inlet passage in such a way that the stalks are completely taken over by the movable fingers situated on one side only of the inlet passage.

The cooperation between the stalks, the edges of the cut out and the fingers make it possible to reduce the shocks, in particular by means of friction, exerted on the stalks and on heads, and to raise beaten down stalks.

Preferably the edges of the offset cut out are substantially straight, the median direction of this cut out being inclined to the median direction of the inlet passage.

Advantageously the harvesting device comprises, towards the end of the cut out remote from the inlet for the stalks, an adjustable cam and a detachable cutter knife.

The cam makes it possible to reduce the width of the cut out and to adjust the restraining of the stalks in accordance with the mean size of these stalks.

Advantageously, the cam is movably mounted, in particular movable for rotation around a pin, and provision is made for elastic means for straining this cam in the direction which reduces the width of the cut out.

The cutter knife can be inlaid in the plate. One of the ends of the cutting face of the cutter knife preferably forms an acute angle with one of the edges of the cut out.

BRIEF DESCRIPTION OF THE DRAWINGS

Apart from objects and advantages set out above, the invention further includes a certain number of other details which will be discussed in greater detail below in connection with a particular mode of embodiment described with reference to the attached drawings, but which is in no way restrictive.

In the drawings.

DESCRIPTION OF THE PREFERRED EMBODIMENTS

Figure 1:
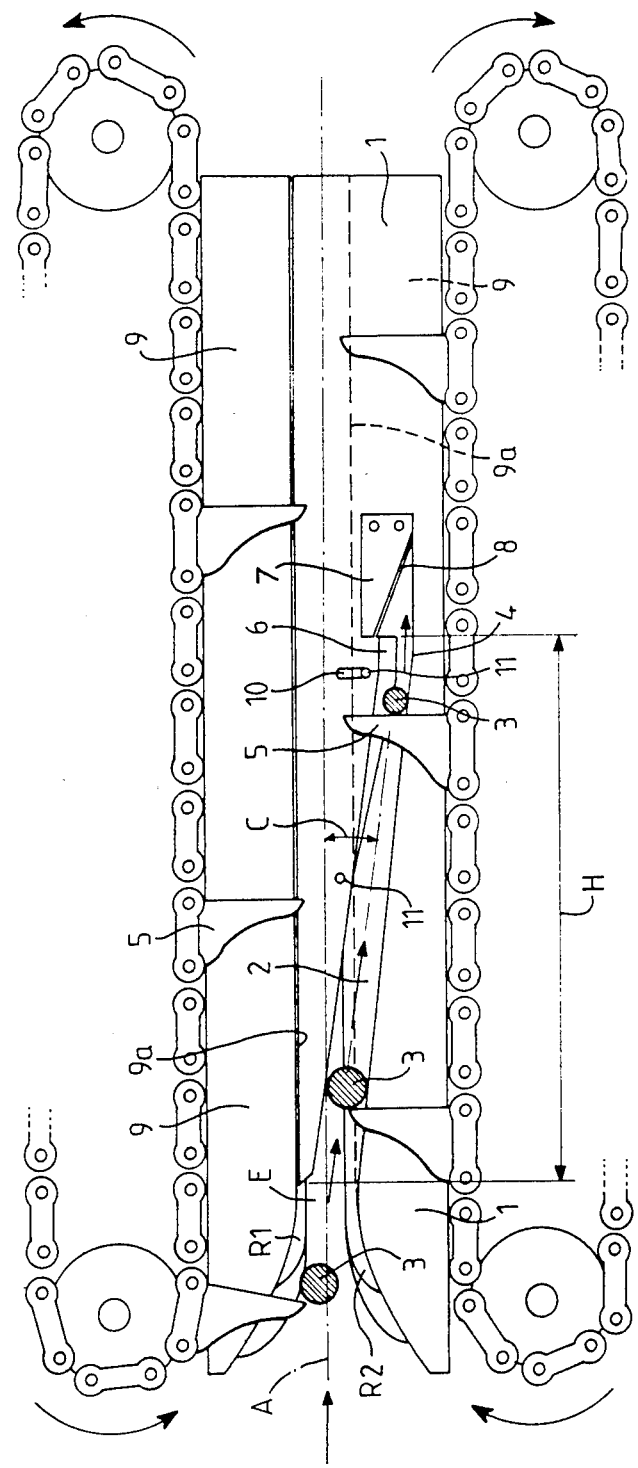
FIG. 1 is a top view of the harvesting device in accordance with the invention, mounted on a partly illustrated cutter intended for one of the corn type stalked plants.
Figure 2:
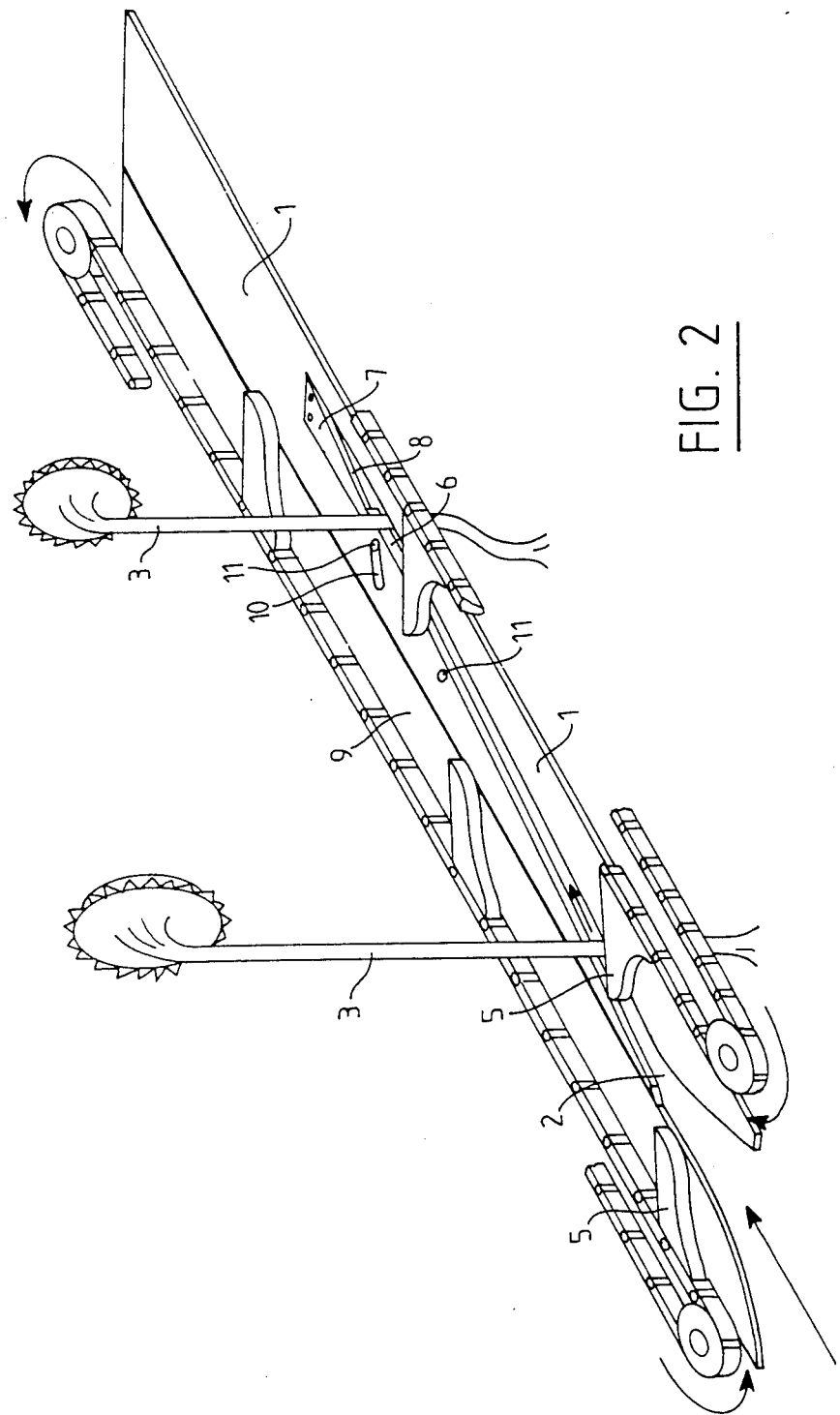
FIG. 2 is a view in perspective of the device of FIG. 1.

As may be seen in FIGS. 1 and 2, the partly illustrated cutter for corn type stalked plants usually comprises at least two stripper plates 9, one of which is represented in a solid line in FIG. 1 and the other in dashes. In fact, according to the invention, this other plate 9 is dismounted from the cutter and is replaced by a harvesting plate 1, comprising a cut out 2. This plate 2 is adapted to be fixed on the cutter by the same means as those serving to fix the plate 9 which has been removed.

On a corn cutter which has not been subjected to the modifications proposed by the invention, the two stripper plates 9 have adjoining edges 9a orientated substantially parallel to the advancing direction of the cutter, these edges 9a defining an inlet passage E whose median direction is designated by dot-dash line A. Movable fingers 5, on displaceably driven gathering chains on either side of the inlet passage E, are displaced towards the cutter, that is to say from left to right in the illustration of FIG. 1, above the plates 9.

To convert the cutter for corn type stalked plants into a cutter for stalked plants of the sunflower kind in accordance with the invention, one of the stripper plates 9, for instance that represented in dashes, is dismounted and is replaced by the harvesting plate 1 whose dimensions are specifically planned for this purpose. The edge 9a remaining in position, and the adjoining edge of the plate 1, are contiguous.

The cut out 2 is offset in relation to the inlet passage E in such a way that the stalks 3 to be harvested are displaced transversely to the advancing direction and are completely taken over by the movable fingers 5 situated on one side only of the inlet passage E. In the example of FIG. 1, the stalks 3 are taken over by the fingers 5 situated below the axis A of the inlet passage E. Preferably the median direction of the cut out 2 is rectilinear, and this direction forms an actue angle c with the direction A.

At its end remote from the inlet for the stalks 3 the cut out 2 is provided with a cam 6 which is adjustable by means of a slot 10 provided in the plate 1, and with a dismountable cutter knife 7 whose cutting face 8 is turned towards the arriving stalks 3.

The cutter knife 7 is inlaid in the plate 1 in such a way that the fingers 5 of the chain pass above the cutter knife so as to shear the stalks 3. This shearing effect is all the more effective if one of the ends of the cutting face 8 of the cutter knife 7 forms an acute angle with one or the other edges of the cut out 2.

Figure 3:
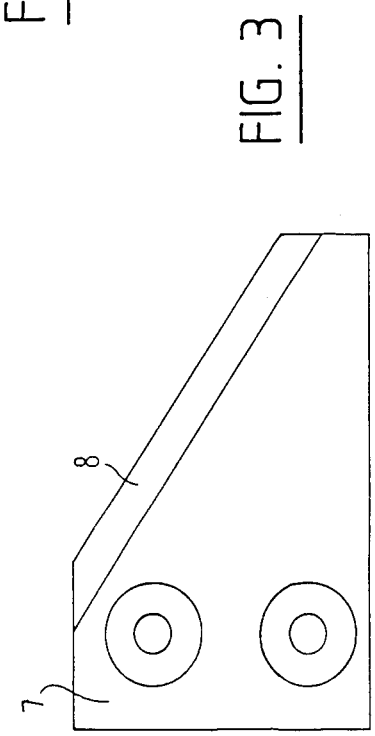
FIG. 3 is a top view of the cutter knife of the device.

FIG. 3 shows the details of the cutter knife 7 and of its cutting face 8.

In the embodiment of FIG. 1, after being set, the cam 6 is secured by means of a screw 11 which passes through the slot 10. The setting of the cam 6 is obtained by loosening the screw 11 in the slot 10 and by causing the cam 6 to swivel around the axis of the other screw 11 situated nearest the front of the cam 6. The swivelling is permitted over an angle depending on the length of the slot 10.

Figure 4:
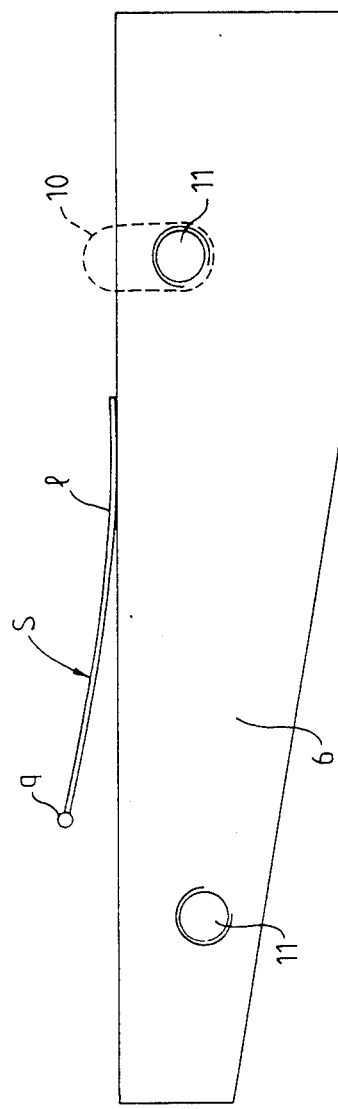
FIG. 4 is a top view of a movable cam for the device.

According to the arrangement represented in FIG. 4, the setting is automatic, because the cam 6 is mounted free for rotation around the axis of the screw 11 situated nearest the front, that is to say the lefthand of the screws 11 in FIG. 4. Elastic means S, formed in particular by a flexible strip 1 having one end q fixed to the plate 1 causes the cam 6 to turn around the screw 11 situated nearest the front and doing so in the direction which reduces the width of the cut out 2 in the region of the cam 6. The stalks 3 of the plants move across the cam 6 by pushing it back against the elastic means S in such a way that an accentuated restraining action is exerted on the stalks 3.

As may be seen in FIG. 1, in a corn cutter normally equipped with two stripper plates 9, the ends of the fingers 5 only project slightly into the inlet passage E and can only exert a weak pulling action on the adjoining portion of the stalks 3. If these stalks 3 are subjected to a relatively strong resistance along the direction of axis A they can, in a normal corn cutter, escape the pulling action of the fingers 5 whose ends tear the adjoining portion of the stalks 3.

On the other hand, when the harvesting plate 1 in accordance with the invention replaces one of the stripper plates 9, the stalks 3 are displaced transversely by the cut out 2 in such a way that the whole transverse cross section of the stalk 3 is situated between the tip of the finger 5 and the chain carrying this finger. The finger 5 can, therefore, exert a considerable pull on the stalk 3 without the stalk escaping therefrom, even if it is subjected to a restraining effect by one of the edges of the cut out and by the cam 6.

It should be noted that generally a cutter for corn type stalked plants comprises means for exerting a downward pull on the stalks 3. These means are generally constituted by two rollers R1, R2, partly represented in FIG. 1, situated below the stripper plates 9 and with their axes parallel to the direction A. These rollers are driven in rotation in opposite directions in such a way that the stalks 3 engaged between these rollers are pulled downward. The rollers R1,R2 can be provided on their cylindrical surface with radial flanges overlapping with each other during rotation. In the case of a cutter for corn or a similar plant whose grains are firmly attached to the ears the rollers exert a pull on the stalks and, allow the ears to be brought against the plates 9 where they are blocked and stripped from the stalks. The ears are then evacuated towards the gatherer.

Such a procedure is not suitable for sunflower type stalked plants whose seeds are easily separated from their heads. The restraining action exerted by the edges of the cut out and the cam, on the stalks 3, opposes the downward pull on these stalks and makes it possible to save the head from being subjected to a relatively fierce impact against the plate 1.

The axial length H (see FIG. 1) of the cut out 2 is chosen to be sufficiently large so that, in the case of the head dropping forward, this head is recovered by the fingers 5 and pulled along towards the cutter.

The progress of the sunflower stalks, represented by hatched circles 3, is easily followed in FIG. 1 from the entry of the gathering inlet E as far as the cutter knife 7.

One of the advantages presented by the device in accordance with the invention lies in the fact that no modification of the original gathering inlets intended for corn or similar plants is necessary, except for the removal of one of the original stripper plates and its replacement by the harvesting plate 1 for stalked plants of the sunflower type.

The operation will thus be easily understood.

The stalks 3 penetrate axially into the harvesting device by the conjugate action of the chain fingers 5. From the time it is seized by the chain fingers the stalk 3 is directed slantingly into the cut out 2 in the plate 1, which forms a substantially straight offset inlet passage. The stalks are guided entirely and progressively by means of the fingers 5 of one single chain.

The stalk 3 cannot escape and is directed laterally into the portion of the cut out 2 provided with the adjustable or movable cam 6 which ensures an accentuated restraining action and makes it possible to obtain a good cut of the stalk by the cutter knife 7 without a loss of seeds. In the case of a beaten down crop, the inclined stalk 3 is found to be raised into a good position by the conjugate restraining action produced by the cut out 2 and the cam 6 and the pulling fingers 5.

The adjustable positioning, due to the scope for movement of the cam 6, is advantageous because it makes it possible to adjust the restraining action on the stalks 3 according to their mean size in the field. This size can vary according to the density of cultivation, the variety and the rainfall conditions.

The stalk 3 pursues its progress under the action of the finger 5 of one single chain towards the dismountable cutter knife 7 which produces a clean cut of the stalk 3. The head of the sunflower or other plant is then evacuated by the conjugate action of the fingers 5 of both chains of the harvester towards the normal threshing unit (not represented) of the machine.

The harvesting device of the invention is of interest to any farmer cultivating or wishing to cultivate sunflowers, or cultivating or wishing to cultivate corn. Having a harvester for corn type stalked plants available, this farmer can give this harvester a multi-purpose function to make it capable of harvesting sunflowers or plants of a similar kind, by replacing one of the stripper plates 9 by the harvesting device 1. The device of the invention can also be of interest to any designer of harvester machines, in particular for corn, because it enables this designer to provide a multi-purpose harvester for his client.

I claim:

1. In a harvesting device for stalked plants of the sunflower kind, adapted to be fitted on any cutters for corn type stalked plants, said cutter comprising:
   (a) at least two stripper plates having adjoining edges orientated substantially parallel to the intended direction of advance of the cutter, said edges defining an inlet passage for the stalks of plants to be harvested, said inlet passage having a median direction;
   (b) movable fingers mounted for displacement above the plates towards the cutter on either side of the said inlet passage, the improvement wherein there is one harvesting plate adapted to be mounted in place of one of the conventional stripper plates, said harvesting plate comprising means defining a cut out which is offset in relation to said inlet passage in such a way that the stalks are completely taken over by said movable fingers situated on one side only of the said inlet passage.

2. A harvesting device according to claim 1, wherein the median direction of the cut out is substantially rectilinear and is inclined to the median direction of said inlet passage.

3. A harvesting device according to claim 1, wherein the harvesting plate has a proximal end adjacent the inlet for the stalks, a distal end, and at said distal end an adjustable cam and a dismountable cutter knife.

4. A harvesting device according to claim 3, wherein said cam is adapted to be set so as to make it possible to adjust the restraining action on the stalks in accordance with the mean size of the said stalks.

5. A harvesting device according to claim 3, wherein the cam has a front end nearer said proximal end of the harvesting plate, and a rear end; and further including (i) means mounting the cam for swivelling movement around an axis situated towards the said front end, and (ii) securing means at said rear end of said cam for securing said cam in position on said harvesting plate, said securing means including a screw situated towards said rear end of the cam and a slot in the plate capable of cooperating with said screw.

6. A harvesting device according to claim 3, including means displaceably mounting the cam on said harvesting plate and elastic means biasing said cam in a direction which reduces the width of the cut out.

7. A harvesting device according to claim 3, including means supporting the cutter knife inlaid in the harvesting plate.

8. A harvesting device according to claim 7, wherein said cut out has first and second opposed edges, and said cutter knife has a cutting face which forms an acute angle with one of said first and second edges of the cut out.

9. A harvesting device according to claim 1, wherein the axial length of said cut out is sufficient so that, in the case of a head of a sunflower plant dropping forward this head will be evacuated towards the cutter by means of the fingers.

* * * * *